United States Patent [19]

Friedl et al.

[11] 4,211,365

[45] Jul. 8, 1980

[54] MOTOR VEHICLE AUXILIARY HEATER

[75] Inventors: Reiner Friedl, Starnberg; Karl Dworschak, Munich; Werner Hornfeck, Unterpfaffenhofen, all of Fed. Rep. of Germany

[73] Assignee: Webasto Werk W. Baier GmbH & Co., Fed. Rep. of Germany

[21] Appl. No.: 887,368

[22] Filed: Mar. 16, 1978

[30] Foreign Application Priority Data

Mar. 18, 1977 [DE] Fed. Rep. of Germany ... 7708511[U]

[51] Int. Cl.² .......................................... B60H 1/22
[52] U.S. Cl. ............................ 237/12.3 C; 64/11 R;
  239/214.21; 415/214; 310/75 D
[58] Field of Search .............. 310/75 R, 75 D, 67 R;
  417/DIG. 1; 418/48; 415/213 R, 214, 197, 53
  T; 431/168, 169; 239/214.11, 214.17, 214.21,
  214.23; 64/11 R, 11 B, 27 NM

[56] References Cited

U.S. PATENT DOCUMENTS

| | | | |
|---|---|---|---|
| 2,170,036 | 8/1939 | Schumann | 310/75 D X |
| 2,532,145 | 11/1950 | Byram | 418/48 |
| 2,915,979 | 12/1959 | Bourke et al. | 418/48 |
| 3,094,979 | 6/1963 | Vohlbehr et al. | 126/110 R |
| 3,195,641 | 7/1965 | Becker | 418/48 X |
| 3,678,386 | 7/1972 | Miles | 310/67 X |
| 3,707,082 | 12/1972 | Ulics | 64/11 B |
| 3,747,366 | 7/1973 | Ruggen et al. | 64/27 NM X |
| 3,747,367 | 7/1973 | Muller | 64/11 B |
| 3,873,863 | 3/1975 | Pew | 310/75 X |
| 3,905,208 | 9/1975 | Oyama et al. | 64/11 R |
| 4,125,790 | 11/1978 | Stratienko | 310/75 D |

FOREIGN PATENT DOCUMENTS 566988 of 0000 U.S.S.R. .................... 64/11 B

*Primary Examiner*—William E. Wayner
*Assistant Examiner*—William E. Tapolcai, Jr.
*Attorney, Agent, or Firm*—Craig & Antonelli

[57] ABSTRACT

An auxiliary heater for motor vehicles having a burner assembly for liquid fuels is provided with an electric motor whose shaft is coupled to a drive shaft for auxiliary assemblies, such as a combustion air blower, a fuel pump, a rotational atomizer, or the like, with the drive shaft being mounted at its distal end with respect to the motor and the proximal end of the drive shaft is connected to the motor shaft by way of a flexible elastic coupling. In a preferred embodiment, the combustion air blower is disposed between the motor and the fuel pump and has a hub of flexible elastic material which serves as the coupling element between the motor shaft and the drive shaft. According to a further disclosed feature, the drive shaft extends through the radial bearing and supports a rotational atomizer head at its distal end.

8 Claims, 1 Drawing Figure

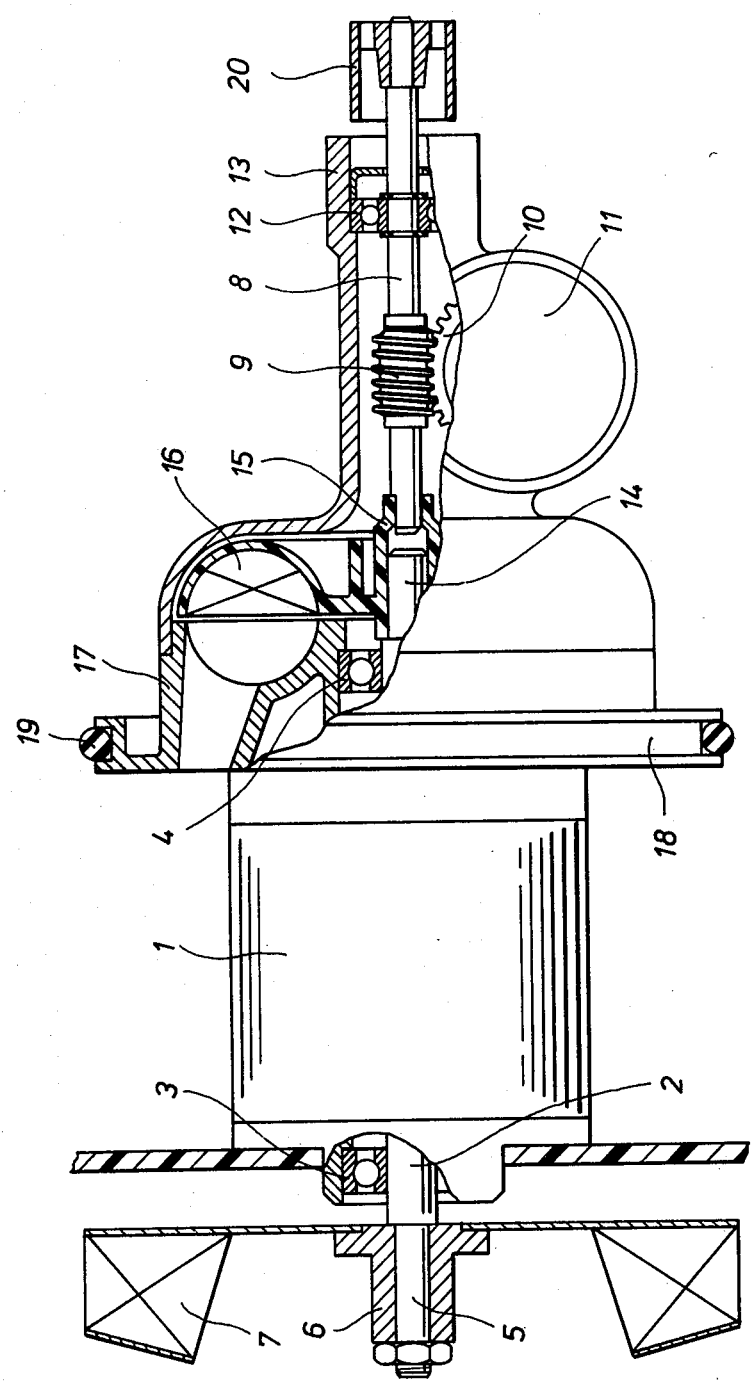

MOTOR VEHICLE AUXILIARY HEATER

BACKGROUND AND SUMMARY OF THE INVENTION

The present invention relates to motor vehicle auxiliary heaters of the type having a burner assembly for liquid fuels wherein the heater is provided with an electric motor whose shaft drives a drive shaft for such auxiliary assemblies as a combustion air blower, a fuel pump, a rotary atomizer or the like.

Known burner assemblies are designed as single shaft assemblies, whereby the ends of the motor shaft are made sufficiently long that they can accept the drive elements of the auxiliary assemblies. For example, U.S. Pat. Nos. 3,094,979; 3,779,229; and 3,989,029 all disclose liquid fuel heating devices for motor vehicles wherein an atomizer, a blower for combustion air, and a fuel pump are mounted in axial alignment with a motor about its drive shaft so as to be driven thereby. As can be appreciated from a review of the devices disclosed in these patents, the motor shaft is mounted in two bearings in the electric motor housing and at least one end of the motor shaft must extend a distance from the motor housing which is relatively long in comparison with the length of the motor shaft between the bearings. Such an arrangement wherein an end of the motor shaft must extend for a substantial distance for the purpose of driving auxiliary assemblies produces structural and manufacturing problems.

Accordingly, there has been a tendency to use individually mounted assemblies, consisting of a fuel pump, combustion air blower, and rotational atomizer, whose drive shaft is supported by two bearings in a housing and are connected with the motor shaft by an elastic or an electro-magnetic coupling. In comparison with the above-noted single-shaft design, this solution requires two additional bearings and a coupling and is therefore relatively costly.

Therefore, a goal of the present invention is to provide a burner assembly in which on the one hand, the use of long, free shaft ends on the motor shaft is avoided, but the bearings of the drive shaft can be simple in nature.

The above-noted disadvantages of the prior art arrangements can be avoided and the recited goal achieved according to the present invention by utilizing a drive shaft which is separate from the shaft of the motor and by connecting its end proximal with respect to the motor to the motor shaft by a flexible elastic coupling while supporting its distal end within a radial bearing which is mounted within a housing which is connected with the housing of the electric motor.

A proposal according to the present invention makes it possible to mount the drive shaft in only one radial bearing, whereby errors in alignment can be overcome by a combination of the flexible elastic coupling and the play in the radial bearing. If the bearing play is too small, the radial bearing can be made in the form of a self-aligning ball bearing or roller bearing.

In a vehicle auxiliary heater with a burner assembly in which the combustion air blower is disposed between the electric motor and the fuel pump and a blower fan is rotatably driven by the motor shaft, the hub of the blower fan is utilized as the coupling between the motor shaft and the drive shaft with the hub being made of a flexible elastic material.

Furthermore, in a burner assembly having a rotational atomizer, the drive shaft is extended through the radial bearing so as to support the atomizer head.

These and further objects, features and advantages of the present invention will become more obvious from the following description when taken in connection with the accompanying drawing which shows, for purposes of illustration only, a single embodiment in accordance with the present invention.

BRIEF DESCRIPTION OF THE DRAWING

The sole FIGURE of the drawing illustrates a burner assembly for a motor vehicle auxiliary heater in schematic form and in partial lengthwise section.

DETAILED DESCRIPTION OF THE PREFERRED EMBODIMENT

The burner assembly shown in the figure is provided with an electric motor 1, whose shaft 2 is supported in radial bearings 3 and 4 in the housing of the electric motor 1. At the left end 5 of the motor shaft 2 (as viewed in the drawing), the hub 6 of a hot air blower fan 7 is mounted. At the other side of the motor, in contrast to the prior arrangements wherein the motor shaft extends axially from the motor housing a sufficient distance so as to drive a fuel pump or other auxiliary assemblies, a drive shaft 8 is disposed coaxially with respect to the motor shaft 2 and the drive shaft 8 supports a worm 9, for driving a fuel pump 11 through a gear 10.

The drive shaft 8 is supported at its distal end (i.e., that end which is away from electric motor 1) by means of a radial bearing 12 mounted within a housing 13. The housing 13 is in turn connected to the housing of the electric motor 1. Additionally, the proximal end of the drive shaft 8 which faces electric motor 1 is connected at the end 14 of motor shaft 2 by way of a flexible elastic coupling 15.+ +Advantageously, this coupling is formed in the preferred embodiment by the hub of the combustion air blower fan 16, said fan being connected to the shaft end 14 so as to be rotated therewith. The combustion air blower in the embodiment illustrated is in the form of a "peripheral" blower, and its housing is formed in part by the housing 13 and in part by the side cover 17 of the housing of the electric motor 1.

Furthermore, as can be seen from the drawing, cover 17 is provided with a circumferential groove 18 into which a O-ring is inserted, and by means of which the burner assembly can be inserted in a sealed manner in an overall housing which has been eliminated from the illustration in the drawing as the specific form of the burner housing is not material to the present invention and those of ordinary skill in the art will be aware of the form that a suitable arrangement should take.

Lastly, as also shown in the figure, the drive shaft 8 extends rightward through radial bearing 12 and supports a rotational atomizer head 20 at its end. Fuel is fed from pump 11 to the atomizer head and, though the feed line is not shown, those of ordinary skill in the art will be aware of the form which such a line should take.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. In an auxiliary heater for motor vehicles with a burner assembly for liquid fuels of the type which is provided with a motor having a motor shaft for driving auxiliary assemblies such as a combustion air blower, a fuel pump, rotational atomizer or the like, the improvement comprising a drive shaft having a distal end with respect to said motor mounted in a radial bearing which is supported in a housing of said burner assembly and which has its proximal end with respect to the motor connected to the motor shaft by way of a flexible elastic coupling said radial bearing being the only bearing supporting said drive shaft, such that auxiliary assemblies may be driven by said motor by way of said drive shaft.

2. An auxiliary heater for a motor vehicle according to claim 1, wherein said radial bearing is in the form of a self-aligning roller bearing.

3. An auxiliary heater for a motor vehicle according to claim 1, wherein said drive shaft extends through said radial bearing and supports a rotational atomizer head at its distal end.

4. An auxiliary heater for a motor vehicle according to claim 2, wherein said drive shaft extends through said radial bearing and supports a rotational atomizer head at its distal end.

5. In an auxiliary heater for motor vehicles with a burner assembly for liquid fuels of the type which is provided with a motor having a motor shaft for driving auxiliary assemblies such as a combustion air blower, a fuel pump, rotational atomizer or the like, the improvement comprising a drive shaft having a distal end with respect to said motor mounted in a radial bearing which is supported in a housing of said burner assembly and which has its proximal end with respect to the motor connected to the motor shaft by way of a flexible elastic coupling, such that auxiliary assemblies may be driven by said motor by way of said drive shaft, wherein the burner assembly is provided with a combustion air blower fan disposed between the motor and a fuel pump, said combustion air blower fan being mounted upon said motor shaft so as to be rotated thereby, and said combustion air blower fan having a hub formed of a flexible elastic material which serves as said flexible elastic coupling between the motor shaft and the drive shaft.

6. An auxiliary heater for motor vehicles according to claim 5, wherein said radial bearing is made in the form of a self-aligning roller bearing.

7. An auxiliary heater for a motor vehicle according to claim 5, wherein said drive shaft extends through said radial bearing and supports a rotational atomizer head at its distal end.

8. An auxiliary heater for a motor vehicle according to claim 6, wherein said drive shaft extends through said radial bearing and supports a rotational atomizer head at its distal end.

* * * * *